(No Model.)
J. AUSTIN.
VALVE.
No. 594,927.   Patented Dec. 7, 1897.
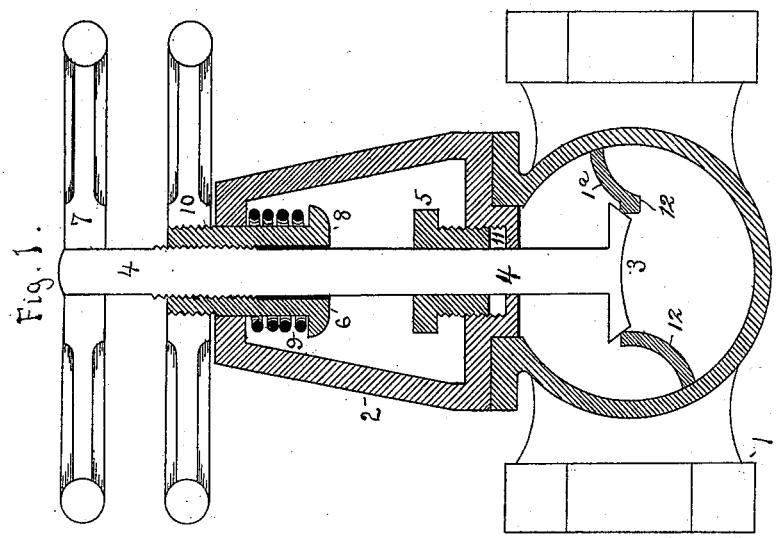
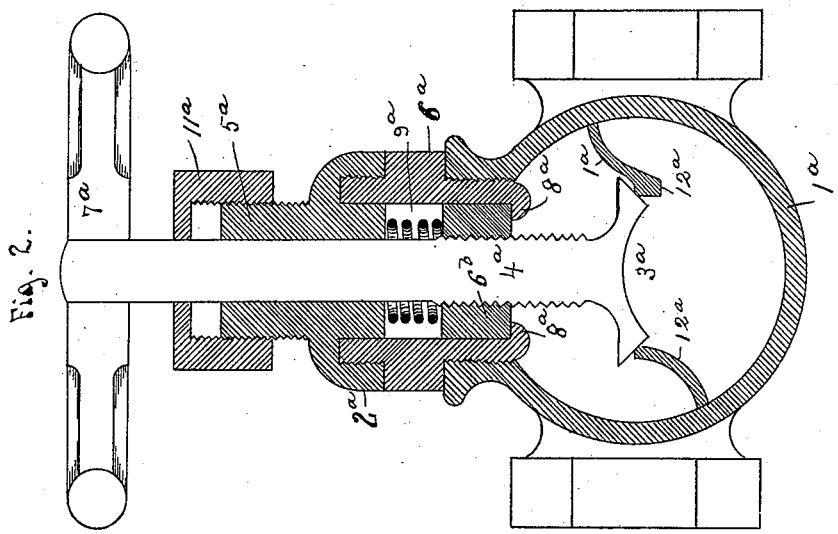
WITNESSES
Edw. K. Campbell
Hal. Campbell
Josiah Austin   INVENTOR
BY
C. D. Campbell.
ATTORNEYS.

UNITED STATES PATENT OFFICE.

JOSIAH AUSTIN, OF MARION, OHIO.

VALVE.

SPECIFICATION forming part of Letters Patent No. 594,927, dated December 7, 1897.

Application filed June 12, 1895. Serial No. 552,515. (No model.)

*To all whom it may concern:*

Be it known that I, JOSIAH AUSTIN, a citizen of the United States, and a resident of Marion, in the county of Marion and State of Ohio, have invented certain new and useful Improvements in Globe-Valves, of which the following is a specification.

The object of my invention is to provide a valve that can be easily loosened from its seat when desired without turning the valve on its seat and means by which scale and other foreign matter or impurities may be ground off the seat and valve simultaneously.

It is well known to all users of the ordinary globe-valve that through the unequal expansion of the valve-stem and the yoke or housing on the walls of the device and from other causes the valve often gets fixed on its seat so tightly, the metallic faces adhering so closely as to resist all efforts to turn the valve so as to detach the latter, that the valve-stem is often broken in trying to release it. My device is so constructed that the valve can be drawn straight away from its seat when it sticks or sets and can be returned again to grind or smooth the surface or free it from scale and other foreign matter or impurities.

My improvement consists in a globe-valve having novel features of construction, as hereinafter described and claimed.

In order that my invention may be clearly understood, I will proceed to describe it with reference to the accompanying drawings, in which—

Figure 1 is a vertical longitudinal central section through my improved globe-valve. Fig. 2 is a similar view showing a modification of the same.

1 is the casing or barrel of the valve, provided with the usual partition 12, in which is located the valve-seat.

2 is the yoke or frame surmounting the casing or barrel.

3 is the valve, having a stem 4 rigid therewith, which plays freely through the screw-threaded stuffing-box 11 and screw-threaded collar 5, adjustable therein. The stem is formed with a screw-thread near its upper end, on which is supported a slidable nut 6, extending freely through the upper end of the yoke or frame. The lower end of the slidable nut is formed with a shoulder or flange 8, and between this shoulder and the top of the yoke or frame is located a tension-spring 9 for holding the valve to its seat. The bore of the nut 6 is screw-threaded to receive the correspondingly screw-threaded hub of an adjusting inner hand-wheel 10, by which the pressure of the tension-spring is controlled and whereby the nut is raised and lowered to elevate and depress the valve.

7 is the outer hand-wheel, fixed to the outer end of the stem, whereby the latter is turned to open and close the valve.

In the modification shown in Fig. 2 I show a reversal of some of the parts of the device. $1^a$ is the barrel or casing, having a partition $12^a$, containing the valve-seat. $3^a$ is the valve, having a stem $4^a$ screw-threaded at its lower end, so as to carry and turn in the inner sliding part $6^b$ of the nut $6^a$, which is screw-threaded into the barrel or casing $1^a$ instead of, as in Fig. 1, the upper end of the yoke or frame, the sliding part $6^b$ being supported on a shoulder or flange $8^a$, formed on the lower end of the nut. $2^a$ is the yoke or frame surmounting the nut, and $9^a$ is the spring, located between the sliding part of the nut and the housing, for seating the valve. The housing $2^a$ is formed with a screw-threaded collar $5^a$, on which works the screw-threaded adjustable stuffing-box $11^a$. In this form of my invention the adjusting hand-wheel is dispensed with. $7^a$ is a hand-wheel secured to the valve-stem, whereby the valve can be lifted bodily against the pressure of the seating-spring $9^a$ and by which the valve is also opened and closed.

The operation of my device is as follows: Should the valve stick or adhere to its seat, the operator takes hold of the inner hand-wheel 10 and turns it to the left until the tension of the spring is somewhat released from the shoulder. He then takes hold of the outer hand-wheel 7 and turns it to the left, withdrawing the valve from its seat, or he can continue to turn the inner hand-wheel to the right, which will do the same thing. Should the valve or valve-seat become coated with scale, sediment, or other impurities, the operator by turning the wheel 10 to the right releases the pressure of the valve on its seat, and then taking hold of both wheels turns them backward and forward, grinding the faces of the valve and its seat together, grinding off the impurities, stopping occasionally to tighten up the tension until all foreign matter is ground off.

By my arrangement the valve can be used as a pressure-valve or ordinary globe-valve at will. When it is desired to use it as a pressure-valve, the valve is run up by means of the outer wheel 7 as near to its seat as desired, and by means of the inner hand-wheel 10 the tension is regulated to force the valve to its seat and give it the resistance desired.

Having thus described my invention, the following is what I claim as new therein and desire to secure by Letters Patent:

1. A globe-valve comprising a barrel having a partition formed with a valve-seat, a valve having a screw-threaded stem, a yoke, and stuffing-box through which the stem slides, the valve-seating spring, the nut having its bore screw-threaded and secured to the stem and a shoulder receiving the pressure of the spring which seats the valve, and the hand-wheel secured to the stem; substantially as described.

2. A globe-valve comprising a casing having a valve-seat, the valve having a screw-threaded stem and seating on the valve-seat, a yoke, a nut provided with a shoulder, a hand-wheel loosely mounted on the nut for raising and lowering the latter, the spring for depressing the nut, and a hand-wheel fixed to the stem; substantially as described.

JOSIAH AUSTIN.

Witnesses:
EDWARD K. CAMPBELL,
ALICE M. RANKIN.